US011224078B2

(12) United States Patent
Palamara et al.

(10) Patent No.: US 11,224,078 B2
(45) Date of Patent: Jan. 11, 2022

(54) MULTI-OPERATOR MEC SHARING BASED ON USER EQUIPMENT LOCATION

(71) Applicant: Verizon Patent and Licensing Inc., Washington, DC (US)

(72) Inventors: Maria E. Palamara, Denville, NJ (US); Kyriaki Konstantinou, New York, NY (US); Jyoti Bali Sharma, Short Hills, NJ (US); Eric Nagy, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/803,495

(22) Filed: Feb. 27, 2020

(65) Prior Publication Data

US 2021/0243821 A1 Aug. 5, 2021

Related U.S. Application Data

(60) Provisional application No. 62/969,303, filed on Feb. 3, 2020.

(51) Int. Cl.
| | |
|---|---|
| *H04W 76/10* | (2018.01) |
| *H04W 48/18* | (2009.01) |
| *H04W 88/16* | (2009.01) |
| *H04W 64/00* | (2009.01) |

(52) U.S. Cl.
CPC ............ *H04W 76/10* (2018.02); *H04W 48/18* (2013.01); *H04W 64/003* (2013.01); *H04W 88/16* (2013.01)

(58) Field of Classification Search
CPC ....... H04W 76/00–20; H04W 4/42–48; H04W 8/08–16; H04W 48/18; H04W 88/16
See application file for complete search history.

(56) References Cited

U.S. PATENT DOCUMENTS

| | | | |
|---|---|---|---|
| 10,299,128 B1* | 5/2019 | Suthar | H04L 9/3239 |
| 2018/0349203 A1* | 12/2018 | Ohta | G06F 9/45558 |
| 2019/0132727 A1* | 5/2019 | Shekhar | H04W 8/183 |
| 2019/0141536 A1* | 5/2019 | Bachmutsky | H04W 12/08 |

* cited by examiner

*Primary Examiner* — San Htun

(57) ABSTRACT

A network device, in a first wireless network operated by a first network operator, receives a first location of a user equipment device (UE) and a second location of a Multi-Access Edge Computing data center (MEC) operated by a second network operator. The network devices performs at least one of: 1) determining a closest gateway or user plane function (UPF) to the MEC data center within the first wireless network; or 2) deploying a Virtual Network Function (VNF) in a particular hosting center that is close to the MEC. The network device sets up a connection between at least one of the determined closest gateway or UPF and the MEC, or the deployed VNF and the MEC, to enable the UE to access the MEC via the first wireless network.

20 Claims, 11 Drawing Sheets

MULTI-OPERATOR MEC SHARING BASED ON USER EQUIPMENT LOCATION

CROSS-REFERENCE TO RELATED APPLICATION

This application claims priority under 35 U.S.C. § 119, based on U.S. Provisional Application No. 62/969,303, filed Feb. 3, 2020, the disclosure of which is hereby incorporated by reference herein.

BACKGROUND

Edge computing may involve a cloud-based Information Technology (IT) service environment located at an edge of a network. One of the purposes of edge computing is to enable high-bandwidth, low-latency access to latency-sensitive applications distributed at the edge of the network closest to the user. A primary goal of edge computing is to reduce network congestion and improve application performance by executing task processing closer to end users thereby improving the delivery of content and applications to the end users and reducing transport costs for high bandwidth services. Applications where edge computing is highly desirable may include on-line gaming, augmented reality (AR), virtual reality (VR), wirelessly connected vehicles, and Internet of Things (IoT) applications (e.g., industry 4.0 applications). Additionally, edge computing can be beneficial in large public venues and enterprise organizations where venue or enterprise services are delivered to onsite consumers from an edge server located at or near the venue or organization. In such large-scale use cases, data content may be locally produced, stored, processed, and/or delivered from an edge server, thus, ensuring reduced backhaul, low latency, or even ultra-low latency. Multi-Access Edge Computing (MEC) is one type of edge computing. MEC moves the processing, storing, and/or delivery of traffic and services from a centralized network to a data center(s) at the edge of the network, closer to the end user.

DETAILED DESCRIPTION OF THE PREFERRED EMBODIMENTS

Figure 1:
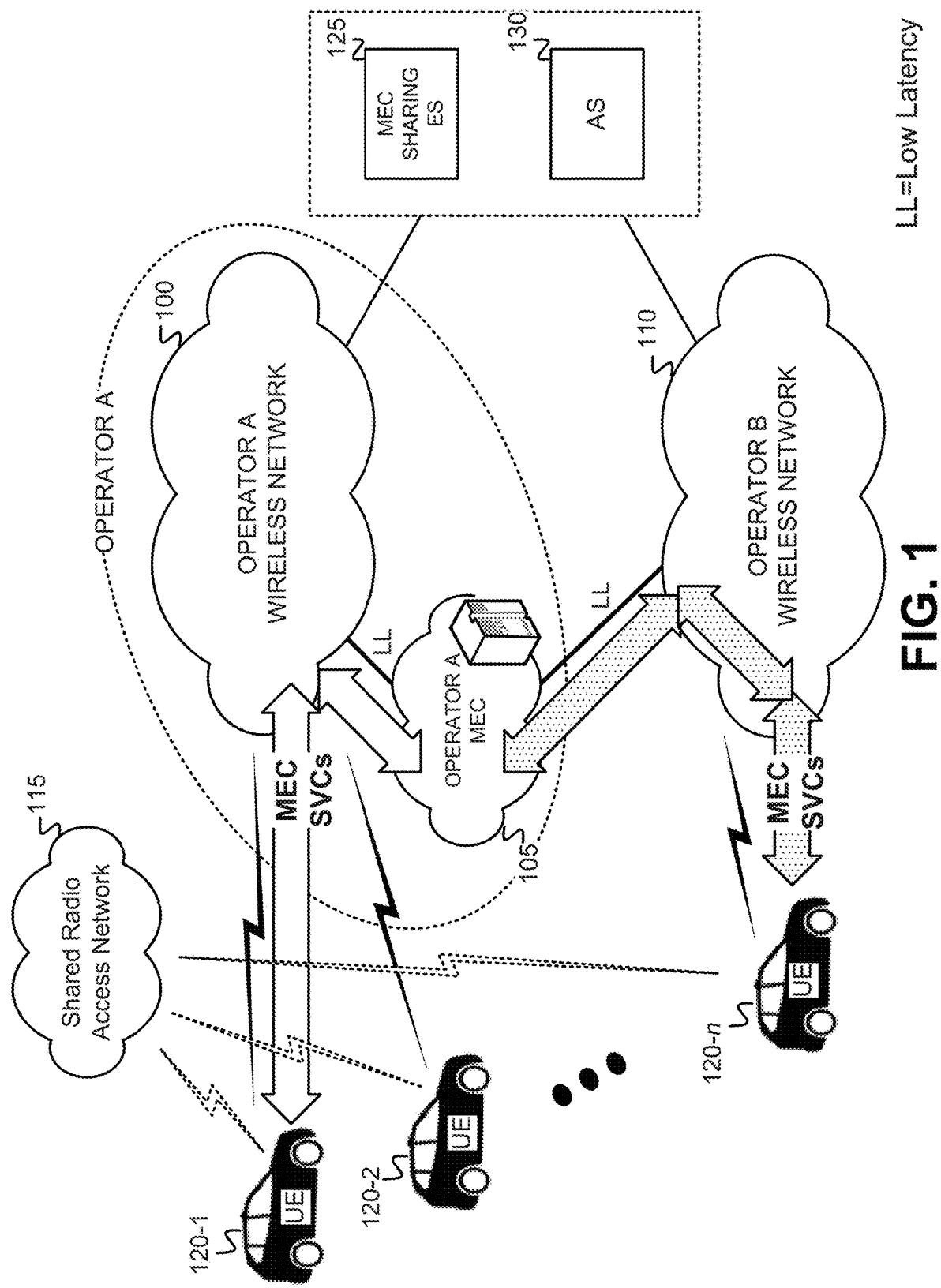
FIG. 1 illustrates an overview of multi-operator MEC sharing to enable user equipment devices (UEs) to access low latency network services within particular geographic areas or regions.

The following detailed description refers to the accompanying drawings. The same reference numbers in different drawings may identify the same or similar elements. The following detailed description does not limit the invention.

Autonomous vehicles (AVs) are vehicles that employ various sensors for sensing the driving environment and use an advanced control system for navigating, without human operator input, based on the sensed driving environment. The various sensors employed by AVs may include, for example, radar, lasers, Global Positioning Systems (GPS), image/video processing systems, and odometers. The advanced control systems interpret the sensor information provided by the various sensors to detect aspects of the driving environment and to identify a navigation route for the vehicles. The sensors, in conjunction with the control systems, are used to understand the world around each vehicle, including the position of surrounding vehicles, the status of any nearby infrastructure, any traffic concerns, and any potential safety hazards. AVs are predicted to reduce traffic accidents and to improve the speed and flow of traffic on vehicle roadways.

With the eventual widespread use of AVs, smart infrastructure (e.g., smart cities) will likely be installed to provide information and services to the AVs. Such infrastructure will likely also request or require information from the AVs. Additionally, at large scale, densely populated locations or venues, content and services associated with low latency-requiring applications (e.g., multi-media, AR, VR, etc.) may be provided to local consumers. To provide such content and services, MEC data centers (referred to herein as "MEC" or "MECs") may be installed in close proximity to the location of the smart infrastructure or the large-scale location or venue. A locally installed MEC may only be accessed via the Radio Access Network (RAN) of the wireless network operated by a network operator that installed the MEC. It is usually cost or space prohibitive for the municipalities and venues to support multiple MECs installed by multiple different network operators. Therefore, there is a need for sharing MEC resources and for UEs, that are subscribers to wireless service provided by a first network operator, to be able to discover and communicate with a local MEC, that is operated by a second network operator, using the RAN and core network operated by the first network operator. A need exists, therefore, to enable sharing the use of a MEC that is operated by one network operator with user devices served by wireless networks operated by other network operators.

Exemplary embodiments described herein implement devices, systems, and methods which enable MEC sharing between wireless networks operated by different network operators. The devices, systems, and methods described herein permit UEs connected to a RAN of a wireless network operated by a first network operator to access applications and services hosted by a MEC operated by a second, different network operator. To implement MEC sharing, UEs and MECs may register with a central network device, that may be external to the wireless networks of both network operators, where registration includes providing the current UE locations and the location of one or more shared MECs. The wireless networks of the UEs, that are requesting access to the MEC(s) of another network operator, then obtain the current locations of UEs and the locations of the MEC(s) from the central network device, and select appropriate packet data gateways or User Plane Functions to establish a connection between the requesting UEs and a particular MEC that ensures low latency UE access to applications and services hosted by the MEC. In an alternative implementation, the wireless networks of the requesting UEs deploy Virtual Network Functions in hosting centers that are nearby a particular MEC to ensure low latency UE access to the applications and services hosted by the MEC.

FIG. 1 illustrates an overview of multi-operator MEC sharing to enable user equipment devices (UEs) to access low latency network services within particular geographic areas or regions. As shown, a first network operator ("operator A") operates a first wireless network 100 ("operator A wireless network 100" or "network A 100") and a first MEC 105 ("operator A MEC 105" or "MEC A 105") within a particular geographic area or region. Operator A wireless network 100 includes components of a first Radio Access Network (RAN)(not shown) and a first core network (not shown) that provide wireless network service within the particular geographic area or region. For example, MEC A 105 may be located in proximity to a particular city (e.g., city center) or venue (e.g., stadium, theme park, etc.). Network operator A may have installed MEC 105 at the location to enable UEs to access low-latency network services at the particular location. The low-latency network services may include, for example, MEC 105 hosting specific applications for access by UEs at the geographic area or region. Network operator B may additionally operate a second wireless network 110 ("operator B wireless network 110" or "network B 110") within the particular geographic area or region. Operator B wireless network 110 includes components of a second RAN (not shown) and a second core network (not shown), that also provide wireless network service within the particular geographic area or region. Operator B wireless network 110 provides a wireless network service that is separate from, but having overlapping wireless geographic coverage with, the wireless network service provided by operator A wireless network 100.

In one implementation, a shared radio access network 115 may broadcast information to UEs 120-1 through 120-n (where n is greater than or equal to one) that are currently located within the particular geographic area or region. The broadcasted information may identify applications, capabilities, and/or network services available via MEC A 105. Shared radio access network 115 may include any type of system, network, or radio communications infrastructure, that implements, for example, Dedicated Short-Range Communications (DSRC), Cellular Vehicle-to-Everything (C-V2X) communications (e.g., via a direct link for vehicle-to-vehicle communications, such as PC5), Wireless Local Area Network (WLAN) communications (e.g., Wi-Fi), or Citizens Broadband Radio Service (CBRS) communications. UEs 120-1 through 120-n, upon receipt of the broadcasted information from shared radio access network 115, may request access to MEC A 105 via their own wireless network. For example, UEs 120-1 and 120-2 in FIG. 1 may request access to MEC A 105 via network A 100, and UE 120-n may request access to MEC A 105 via network B 110.

In a second implementation, UEs 120-1 through 120-n may register with an application server (AS) 130, which has previously registered its capabilities, and established a secure connection, with a MEC sharing enabling server (ES) 125. MEC A 105 additionally registers with MEC sharing ES 125, including providing MEC A 105's location. AS 130, in response to the UE 120's registration, provides the UE's information, location, and Cellular Service Provider (CSP) ID to MEC sharing ES 125. MEC sharing ES 125 then forwards the UE's location and connectivity details, and the location of MEC A 105, to operator B wireless network 110.

Operator B wireless network 110, using the previously received UE location, CSP ID, and MEC 105 location, selects a Packet Data Network Gateway (PGW), Serving Gateway (SGW), or User Plane Function (UPF) within network 110 that is closest to MEC A 105 to enable low latency (LL) access to MEC services by the registered UE 120. Operator B wireless network 110 then sets up a secure connection between the selected PGW, SGW, or UPF and MEC A 105. The registered UEs 120 may then access network services hosted by MEC A 105, or download/upload data from/to MEC A 105, via the secure connection with MEC A 105.

Figure 2:
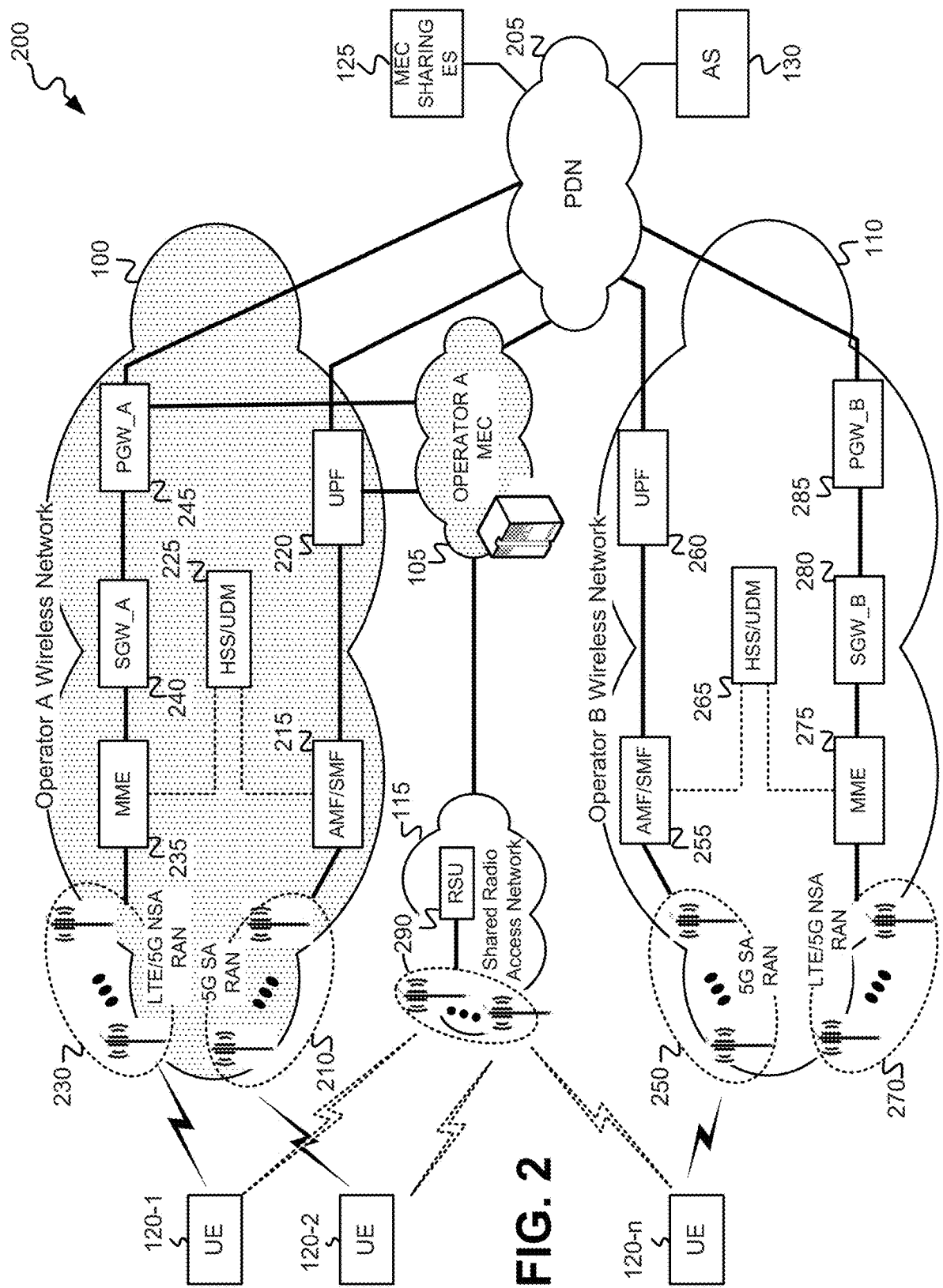
FIG. 2 illustrates an exemplary network environment in which a MEC, operated by a first network operator, may be shared with other wireless networks operated by different network operators.

FIG. 2 illustrates an exemplary network environment 200 in which a MEC, operated by a first network operator, may be shared with other wireless networks operated by different network operators. As shown, network environment 200 includes a first wireless network operated by network operator A (e.g., network A 100) and a first MEC 105 also operated by operator A (e.g., MEC A 105). Network environment 200 additionally includes a second wireless network operated by network operator B (e.g., network B 110), shared radio access network 115, a Packet Data Network (PDN) 205, MEC sharing ES 125, AS 130, and UEs 120-1 through 120-n.

Operator A wireless network 100 may include any type of a Public Land Mobile Network (PLMN) or satellite network that provides wireless network service to UEs. In one implementation, Operator A wireless network 100 may include a hybrid Long Term Evolution/Fifth Generation (LTE/5G) wireless network that includes both LTE network components and 5G network components. For example, as depicted in FIG. 2, Operator A wireless network 100 may include a 5G stand-alone (SA) Radio Access Network (RAN) 210 connected to other 5G network components, such as an Access & Mobility Function/Session Management Function (AMF/SMF) 215, a User Plane Function (UPF) 220, and a Home Subscriber Server/User Data Management function (HSS/UDM) 225. Operator A wireless network 110 may further include a LTE/5G non-stand-alone (NSA) RAN 230 connected to other LTE network components, such as a Mobility Management Entity (MME) 235, Serving Gateway (SGW) 240, PDN Gateway (PGW) 245, and HSS/UDM 225. Operator A wireless network 100 may connect to MEC A 105 via a UPF 220 and/or a PGW 245.

Operator B wireless network 110 may further include any type of a PLMN or satellite network that provides wireless network service to UEs. In one implementation, network B 110 may also include a hybrid LTE/5G wireless network that includes both LTE network components and 5G network components. For example, as depicted in FIG. 2, network B 110 may include a 5G SA RAN 250 connected to other 5G network components, such as an AMF/SMF 255, a UPF 260, and a HSS/UDM 265. Network B 110 may further include a LTE/5G NSA RAN 270 connected to other LTE network components, such as a MME 275, a SGW 280, a PGW 285, and HSS/UDM 265. Network B 110 may connect, indirectly, to operator A MEC 105 via a UPF 260 and/or a PGW 285 and a connection through PDN 205.

MEC A 105 may include one or more network devices networked together in a data center. MEC A 105 may include, for example, a secure gateway, a server, and/or an MEC hosting infrastructure that enable applications and services to be hosted near a particular geographic region to ensure low latency of traffic and services to that geographic region.

Shared radio access network 115 may include any type of system, network, or radio communications infrastructure that provides a shared radio communication interface accessible to any UE 120. Shared radio access network 115 may include, for example, any type of system, network, or radio communications infrastructure that implements DSRC, C-V2X (e.g., via PC5), WLAN communications (e.g., Wi-Fi), or CBRS communications. Shared radio access network 115 may be operated by network operator A, network operator B, by a network operator other than network operators A or B, or may be operated by a government entity (e.g., state government, local municipality). Shared radio access network 115 may include at least one roadside unit (RSU) 290 that, among other functions, broadcasts data to, and/or receives data from, UEs 120 associated with vehicles (e.g., autonomous vehicles).

PDN 205 may include any type packet-switched network that may be used to transport data and to interconnect with other networks and devices. For example, PDN 205 may include a wired and/or wireless local area network LAN, a wired and/or wireless wide area network (WAN), a metropolitan area network (MAN), an intranet, and/or the Internet. As shown in FIG. 2, PDN 205 may interconnect with Operator A wireless network 100, Operator B wireless network 110, Operator A MEC 105, MEC sharing ES 125, and AS 130. Though not shown in FIG. 2, PDN 205 may interconnect with shared radio access network 115.

MEC sharing ES 125 may include one or more network devices that implement functionality for registering network operator MECs, and for sharing those MECs with wireless networks operated by different network operators.

AS 130 may include one or more network devices that host particular applications (apps) that perform various functions and/or provide various different network services. AS 130 may be accessible via PDN 205, network A 100, and/or network B 110.

UEs 120-1 through 120-n (generically referred to herein as "UE 120" or "UEs 120") may each include any type of electronic device having a wireless communication capability. In some embodiments, UEs 120 may each include a mobile wireless device. UEs 120 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an AR/VR headset or glasses; or an Internet of Things (IoT) or Machine-to-Machine (M2M) device. A user (not shown) may carry, use, administer, and/or operate each UE 120.

In an LTE portion of Operator A wireless network 100, PGW 245 includes a network device that acts as a router and a gateway between network 100 and PDN 205, and forwards session data received from UEs 120 to PDN 205 for destinations, and forwards session data received from sources in PDN 205 to UEs 120 connected to a LTE/5G NSA RAN 230. SGW 240 includes a network device that routes and forwards session data between PGW 245 and a LTE/5G NSA RAN 230 serving the session's destination UE 120. MME 235 includes a network device that acts as a control entity for the LTE portion of network A 100, including communicating with HSS/UDM 225 for user/device authentication and user/device profile download. MME 235 further provides UEs 120 with mobility management and session management functions using, for example, Network Access Stratum (NAS) signaling.

LTE/5G NSA RAN 230 may provide wireless network access to UEs 120 and may include, among other components, at least one base-band unit (BBU) and multiple remote radio heads (RRHs) for providing a radio communication interface to UEs 120 that subscribe to LTE wireless network service from network A 100.

In a 5G portion of network A 100, UPF 220 includes a network device that acts as a router and a gateway between network 100 and PDN 205 and/or MEC A 105, and forwards session data between PDN 205 and 5G SA RAN 210. The 5G portion of network 100 may include multiple UPFs 220 disposed at various geographic locations in network A 100. AMF/SMF 215 includes a network device that performs UE-based authentication, authorization, and mobility management for UEs 120, and performs session management, allocates network addresses to UEs 120, and selects and controls the UPFs 220 for data transfer.

5G SA RAN 210 may provide wireless network access to UEs 120 and may include, among other components, at least one base-band unit (BBU) and multiple remote radio heads (RRHs) for providing a radio communication interface to UEs 120 that subscribe to 5G wireless network service from network A 100.

In an LTE portion of Operator B wireless network 110, PGW 285 includes a network device that acts as a router and a gateway between network 110 and PDN 205, and forwards session data received from UEs 120 to PDN 205 for destinations, and forwards session data received from sources in PDN 205 to UEs 120 connected to a LTE/5G NSA RAN 270. SGW 280 includes a network device that routes and forwards session data between PGW 285 and a LTE/5G NSA RAN 270 serving the session's destination UE 120. MME 275 includes a network device that acts as a control entity for network B 110, including communicating with HSS/UDM 265 for user/device authentication and user/device profile download. MME 275 further provides UEs 120 with mobility management and session management functions using, for example, Network Access Stratum (NAS) signaling. LTE/5G NSA RAN 270 may provide wireless network access to UE 120 and may include, among other components, at least one base-band unit (BBU) and multiple remote radio heads (RRHs) for providing a radio communication interface to UEs 120 that subscribe to LTE wireless network service from network B 110.

In a 5G portion of Operator B wireless network 110, UPF 260 includes a network device that acts as a router and a gateway between network B 110 and PDN 205 and/or MEC A 105, and forwards session data between PDN 205 and 5G SA RAN 250. The 5G portion of network B 110 may include multiple UPFs 260 disposed at various geographic locations in network B 110. AMF/SMF 255 includes a network device that performs UE-based authentication, authorization, and mobility management for UEs 120, and performs session management, allocates network addresses to UEs 120, and selects and controls the UPFs 260 for data transfer. 5G SA RAN 250 may provide wireless network access to UEs 120 and may include, among other components, at least one base-band unit (BBU) and multiple remote radio heads (RRHs) for providing a radio communication interface to UEs 120 that subscribe to 5G wireless network service from network B 110.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, though only a single MEC 105, a single shared radio access network 115, a single PDN 205, and two wireless networks 100 and 110 are shown, network environment 200 may include multiple different MECs (each possibly being operated by a different network operator), multiple different shared radio access networks, multiple PDNs, and multiple (i.e., >2) different wireless networks. In the case of multiple MECs 105, each of the multiple MECs 105 may be registered with MEC sharing ES 125 to enable the sharing of the MEC with wireless networks operated by other network operators. In the case of multiple wireless networks, UEs connected to each of the different wireless networks may access, and download and/or upload data from/to, an MEC (e.g., Operator A MEC 105) that has been registered with, and shared via, MEC sharing ES 125.

Figure 3:
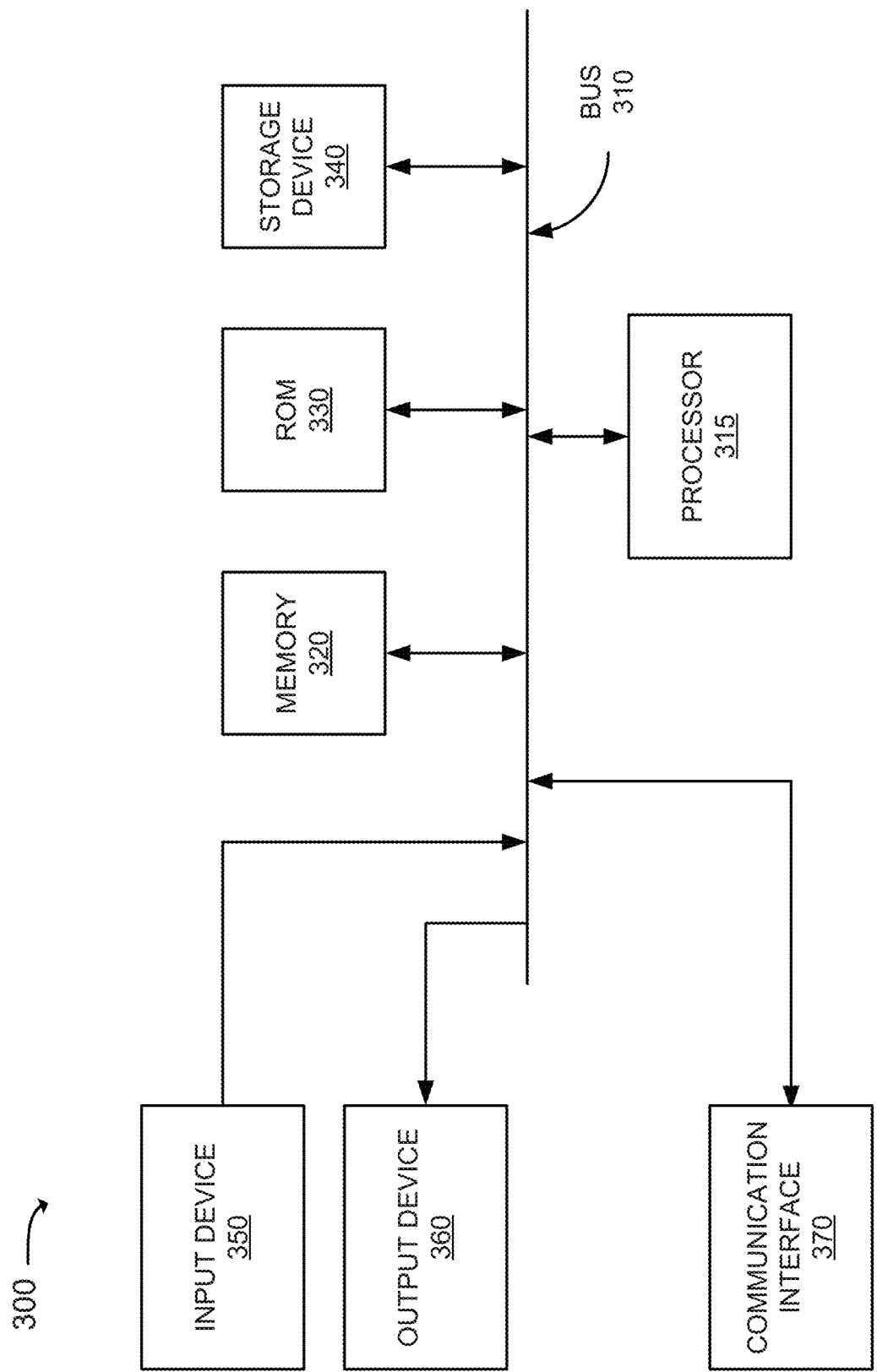
FIG. 3 is a diagram that depicts exemplary components of a device of FIG. 1 or 2.

FIG. 3 is a diagram that depicts exemplary components of a device 300. UEs 120, MEC sharing ES 125, AS 130, MMES 235 and 275, and AMF/SMFs 215 and 255 may be implemented by a same, or similar, components as device 300, and may be arranged in a same, or similar, configuration as device 300. MEC A 105 may additionally include one or more of devices 300 networked together. Device 300 may include a bus 310, a processor 315, a main memory 320, a read only memory (ROM) 330, a storage device 340, an input device 350, an output device 360, and a communication interface 370. Bus 310 may include a path that permits communication among the other components of device 300.

Processor 315 may include one or more processors or microprocessors which may interpret and execute stored instructions associated with one or more processes. Additionally, or alternatively, processor 315 may include processing logic that implements the one or more processes. For example, processor 315 may include programmable logic such as Field Programmable Gate Arrays (FPGAs), Graphic Processing Units (GPUs), or accelerators. Processor 315 may include software, hardware, or a combination of software and hardware for executing the processes described herein.

Main memory 320 may include a random access memory (RAM) or another type of dynamic storage device that may store information and, in some implementations, instructions for execution by processor 315. ROM 330 may include a ROM device or another type of static storage device (e.g., Electrically Erasable Programmable ROM (EEPROM)) that may store static information and, in some implementations, instructions for use by processor 315. Storage device 340 may include a magnetic, optical, and/or solid state (e.g., flash drive) recording medium and its corresponding drive. Main memory 320, ROM 330 and storage device 340 may each be referred to herein as a "non-transitory computer-readable medium" or a "non-transitory storage medium." The processes/methods set forth herein (or at least a portion of the processes/methods set forth herein) can be implemented as instructions that are stored in main memory 320, ROM 330 and/or storage device 340 for execution by processor 315 of a device 300.

Input device 350 may include one or more devices that permit an operator to input information to device 300, such as, for example, a keypad or a keyboard, a display with a touch sensitive panel, voice recognition and/or biometric mechanisms, etc. Output device 360 may include one or more devices that output information to the operator, including a display, a speaker, etc. Input device 350 and output device 360 may, in some implementations, be implemented as a user interface (UI), such as a touch screen display, that displays UI information, and which receives user input via the UI. Communication interface 370 may include one or more transceivers that enable device 300 to communicate with other devices and/or systems. For example, if device 300 is a UE 120, communication interface 370 may include a wireless transceiver for communicating via a wireless link with LTE/5G RAN 230 or 270 and/or 5G RAN 210 or 250. As another example, if device 300 is MEC sharing ES 125 or AS 130, communication interface 370 may include a wired transceiver for communicating with PDN 205, or for communicating with other devices within PDN 205, network A 100, or network B 110.

Device 300 may perform certain operations or processes, as may be described herein. Device 300 may perform these operations in response to processor 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface 370. The software instructions contained in main memory 320 may cause processor 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 300 illustrated in FIG. 3 is for illustrative purposes only. Other configurations may be implemented. Therefore, device 300 may include additional, fewer and/or different components, arranged in a different configuration, than depicted in FIG. 3. For example, device 300 may additionally include a Global Positioning System (GPS) unit or device that can determine a geographic location of device 300.

Figure 4A:
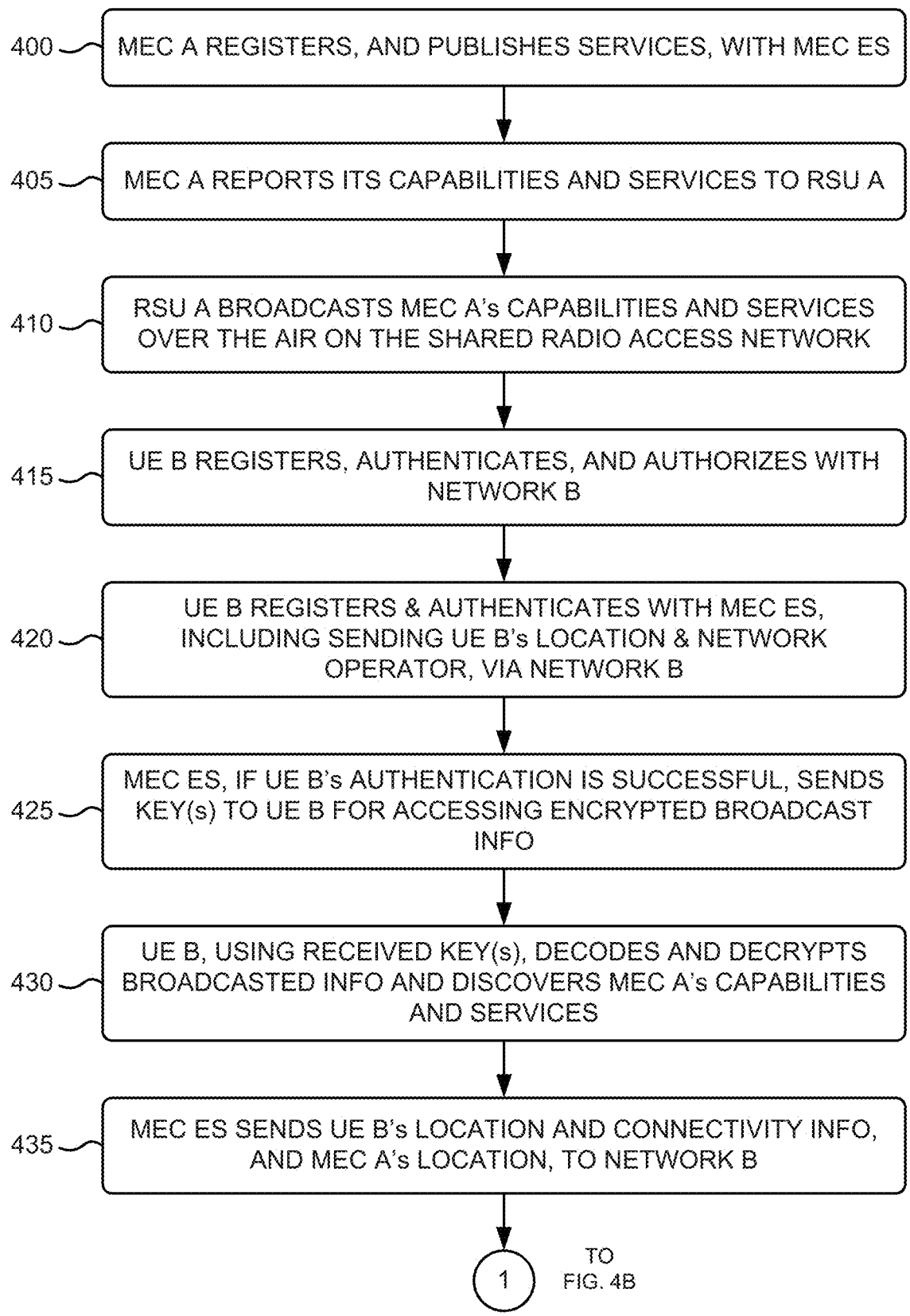
FIGS. 4A and 4B are flow diagrams that illustrate a first implementation of an exemplary process for sharing a MEC data center, operated by a first network operator, for access and use by UEs connected to a wireless network operated by a second, different network operator.
Figure 4B:
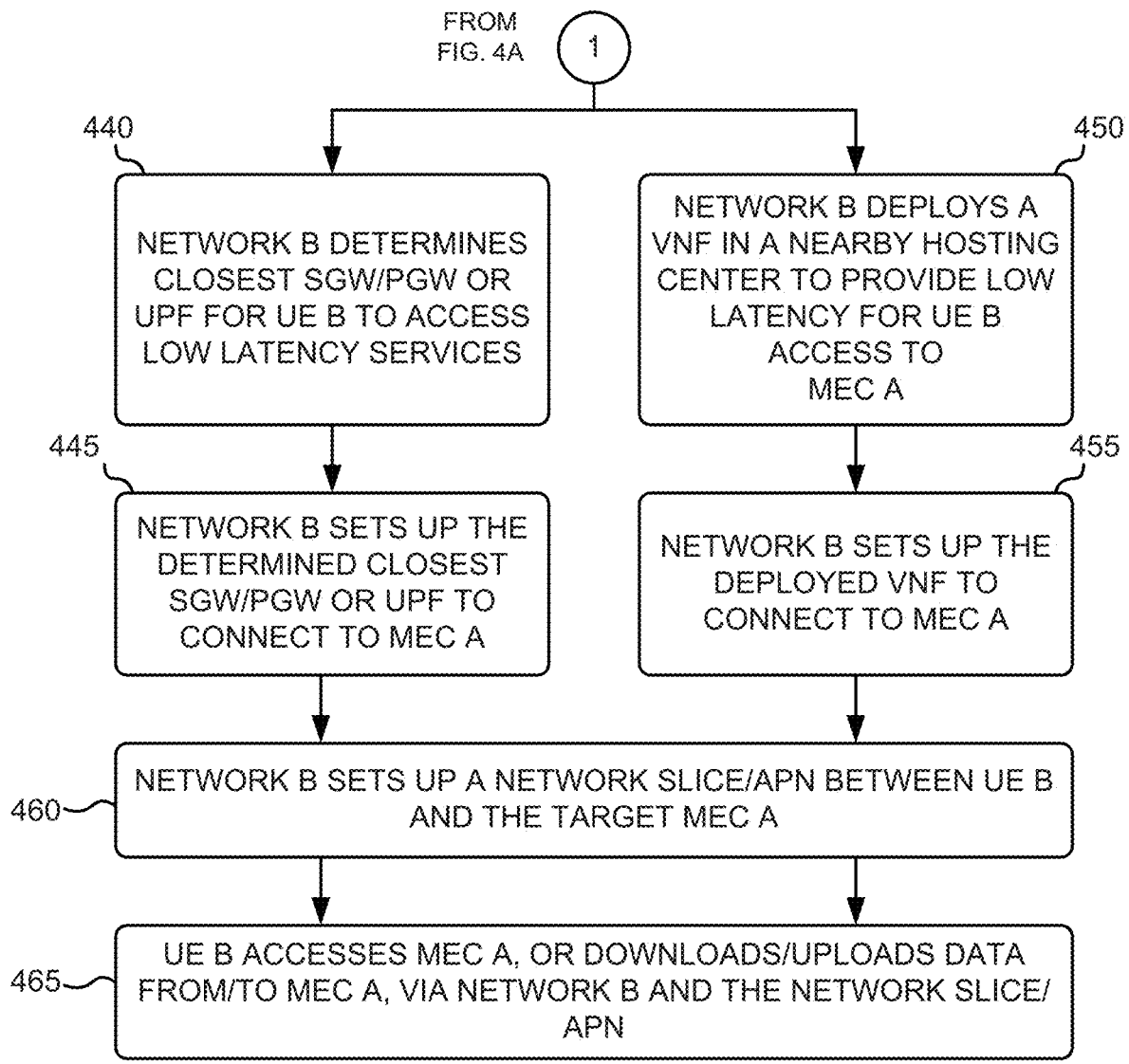

FIGS. 4A and 4B are flow diagrams that illustrate a first implementation of an exemplary process for sharing a MEC data center, operated by a first network operator that owns and/or operates a first wireless network, for access and use by UEs connected to a wireless network operated by a second, different network operator. In the implementation of FIGS. 4A and 4B, UEs 120 discover applications and services available from a local MEC (e.g., MEC A 105) via shared radio access network broadcasts. The exemplary process of FIGS. 4A and 4B may be implemented by various components of network environment 200 and is described below with reference to the signal flow diagram of FIG. 5 and the examples of FIGS. 6 and 7.

Figure 5:
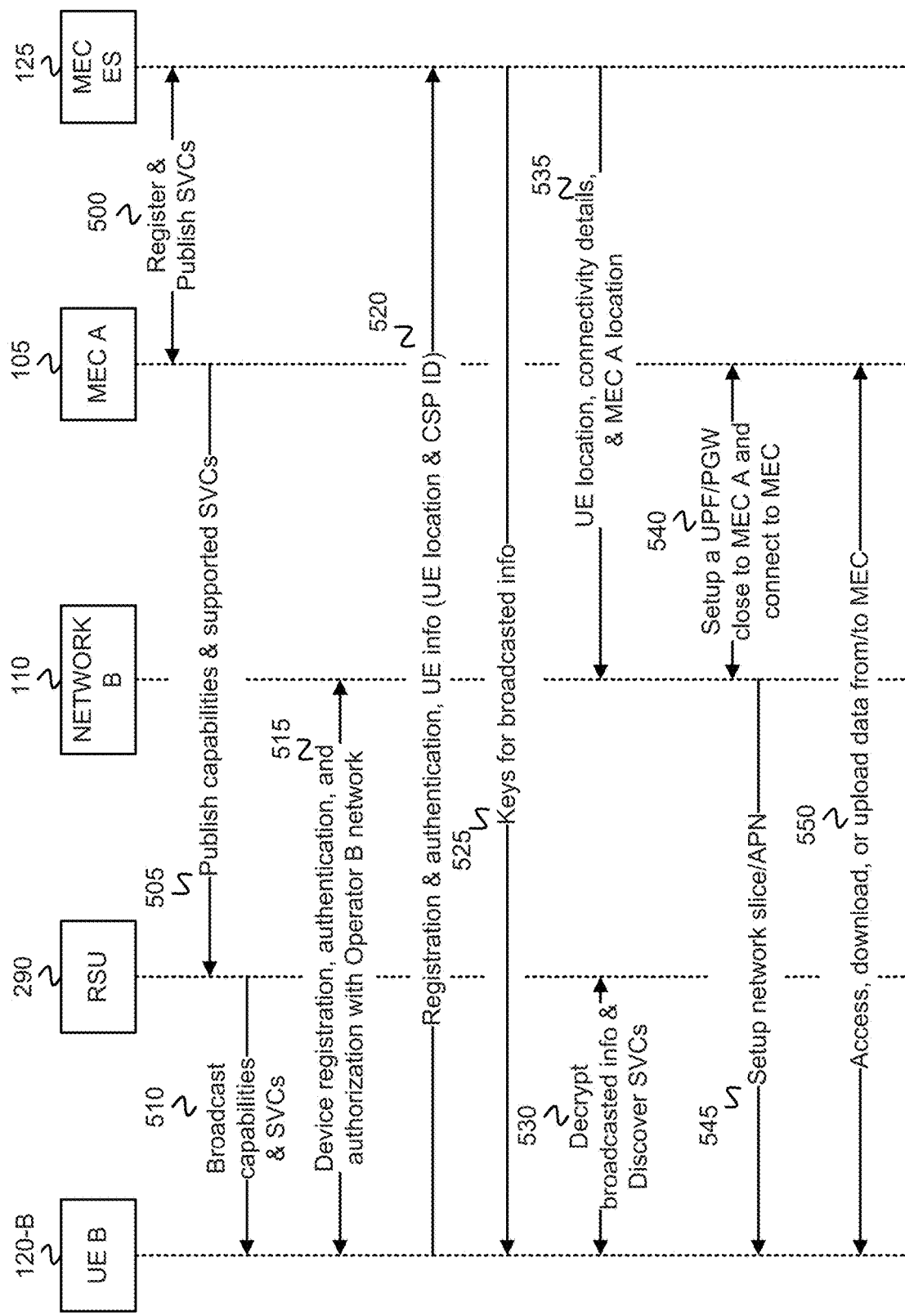
FIG. 5 illustrates an exemplary signal flow diagram associated with the process of FIGS. 4A and 4B.

Prior to execution of the process of FIGS. 4A and 4B, network operator A installs MEC A 105 at a particular geographic location and hosts various applications and/or network services at the MEC 105. Installation of MEC A 105 and hosting of the applications and/or network services by the network operator A may be in accordance with a contract that network operator A has with a government entity or venue (e.g., city, stadium, etc.). In FIG. 5, a UE 120 that subscribes to network service from, and connects to, Operator B wireless network 110 is labeled as "UE B 120-B", and Operator B wireless network 110 is labeled as "network B 110."

The exemplary process includes MEC A 105 registering with, and publishing services to, MEC sharing ES 125 (block 400). Registration of MEC A 105 with MEC sharing ES 125 may include sending MEC A 105's network address(es), and MEC A 105's cryptographic information for secure communications with MEC A 105, to MEC sharing ES 125. Publishing services may include MEC A 105 sending relevant application and/or network service information (e.g., Uniform Resource Locators (URLs), etc.) to MEC sharing ES 125 to enable ES 125, or other devices, to identify particular applications and/or network services hosted by MEC A 105, and to access those applications and/or network services. FIG. 5 shows MEC A 105 registering 500 and publishing applications and services (SVCs) to MEC sharing ES 125.

MEC A 105 reports its capabilities and services to RSU 290 (block 405). When reporting its capabilities and services to RSU 290, MEC A 105 may send relevant application and/or network information to RSU 290 to enable RSU 290 to broadcast that information and make it easily discoverable by UEs 120 when UEs 120 are located in proximity to MEC A 105. MEC A 105 may, for example, periodically report its current capabilities and network services to RSU 290. FIG. 5 depicts MEC A 105 sending a message(s) that publishes 505 its capabilities and supported applications and/or network services to RSU 290 in shared radio access network 115.

RSU 290 of shared radio access network 115 broadcasts MEC A 105's capabilities and services over the air using a secure, encrypted protocol (block 410). RSU 290 may broadcast any of the reported capability and network service information reported from MEC A 105 in block 405 via the system, network, or radio communications infrastructure that implements a shared radio access network, such as, for example, DSRC communications, C-V2X communications (e.g., via PC5), WLAN communications (e.g., Wi-Fi), or CBRS communications. FIG. 5 depicts RSU 290 broadcasting 510 MEC A 105's capabilities and network services to a UE 120-B.

UE B 120-B registers, authenticates, and authorizes with network B 110 (block 415). UE B 120-B engages in existing processes of registration, authentication, and network authorization to attach to network B 110 and to establish a connection with network B 110. FIG. 5 depicts UE B 120-B registering, authenticating, and authorizing 515 with network B 110.

UE B 120-B registers and authenticates with MEC sharing ES 125, including sending UE B 120-B's location and network operator, via wireless network B 110 (block 420). UE B 120-B may authenticate with MEC sharing ES 125 using existing authentication processes. In one implementation, UE B 120-B may obtain geolocation coordinate information from, for example, a Global Positioning System (GPS) device, and may send the coordinate information to MEC sharing ES 125, in addition to the CSP ID of Operator B wireless network B 110 to which UE 120-B is currently connected. FIG. 5 shows UE B 120-B registering and authenticating 520 with MEC sharing ES 125, and sending UE information, such as UE B 120-B's location and a CSP ID associated with network B 110, to MEC sharing ES 125.

MEC sharing ES 125, if UE B 120's authentication is successful, sends a key(s) to UE B 120-B for accessing encrypted broadcast information (block 425). Depending on a type of cryptographic technique implemented by MEC sharing ES 125, MEC sharing ES 125 may send one or more cryptographic keys to UE B 120-B. RSU 290 may encrypt and broadcast the capabilities and services of MEC A 105. UEs 120 receiving the broadcasted information may use the key(s) received from MEC ES 125 to decrypt the broadcasted information and discover the capabilities and services of MEC A 105 based on the decrypted information. FIG. 5 depicts MEC sharing ES 125, subsequent to successful authentication by UE B 120-B, sending 525 a cryptographic key(s) to UE B 120-B to enable UE B 120-B to decrypt broadcasted information from RSU 290.

UE B 120-B, using the received key(s), decodes and decrypts the broadcasted information and discovers MEC A 105's capabilities and services (block 430). MEC A 105 may host applications and services related to, for example, geographic maps, traffic information (e.g., alerts, road conditions, weather conditions, traffic light issues), local attractions, local restaurants, promotions, sports events, social events, autonomous vehicle roadway data, augmented reality (AR), virtual reality (VR), etc. The broadcasted information may provide listings, searchable data, or indexing data for a corpus of data (e.g., a database). FIG. 5 shows UE B 120-B decrypting 530 information broadcasted from RSU 290, and discovering applications and services hosted by MEC A 105 based on the decrypted information.

MEC sharing ES 125 sends UE B 120-B's location and connectivity information, and MEC A 105's location, to wireless network B 110 (block 435). MEC sharing ES 125 retrieves the UE B 120-B's most recent reported location and connectivity information, and MEC A 105's location, from local memory, and inserts the information into a message for sending to network B 110. FIG. 5 shows MEC ES 125 sending a message 535 that includes UE B 120-B's location and connectivity details, and the location of MEC A 105.

In a first embodiment, wireless network B 110 determines a closest SGW/PGW or UPF for UE B 120-B to access low latency services (block 440) and sets up the determined closest SGW/PGW or UPF to connect to MEC A 105 (block 445). If there are multiple registered MEC's in proximity to UE B 120-B, a node in network B 110 (e.g., an MME or AMF/SMF) compares UE B 120-B's location (obtained in block 435) with MEC locations (obtained in block 435) to identify and select a closest MEC of multiple MECs to UE B 120-B that hosts a particular service or application. The node in network B 110 then identifies a SGW/PGW or UPF that is closest to the selected MEC (e.g., MEC A 105) to enable UE B 120-B to access the MEC with the lowest latency. The node in network B 110 (or another node in cooperation with the first node) sets up a connection between the selected MEC and the identified closest SGW/PGW or UPF within network B 110. Identification of a "closest" SGW/PGW or UPF for UE B 120-B to access low latency services may include identifying a SGW/PGW or UPF that is geographically closest to MEC A 105, or identifying a SGW/PGW or UPF that has a lowest latency to and/or from MEC A 105.

Figure 6:
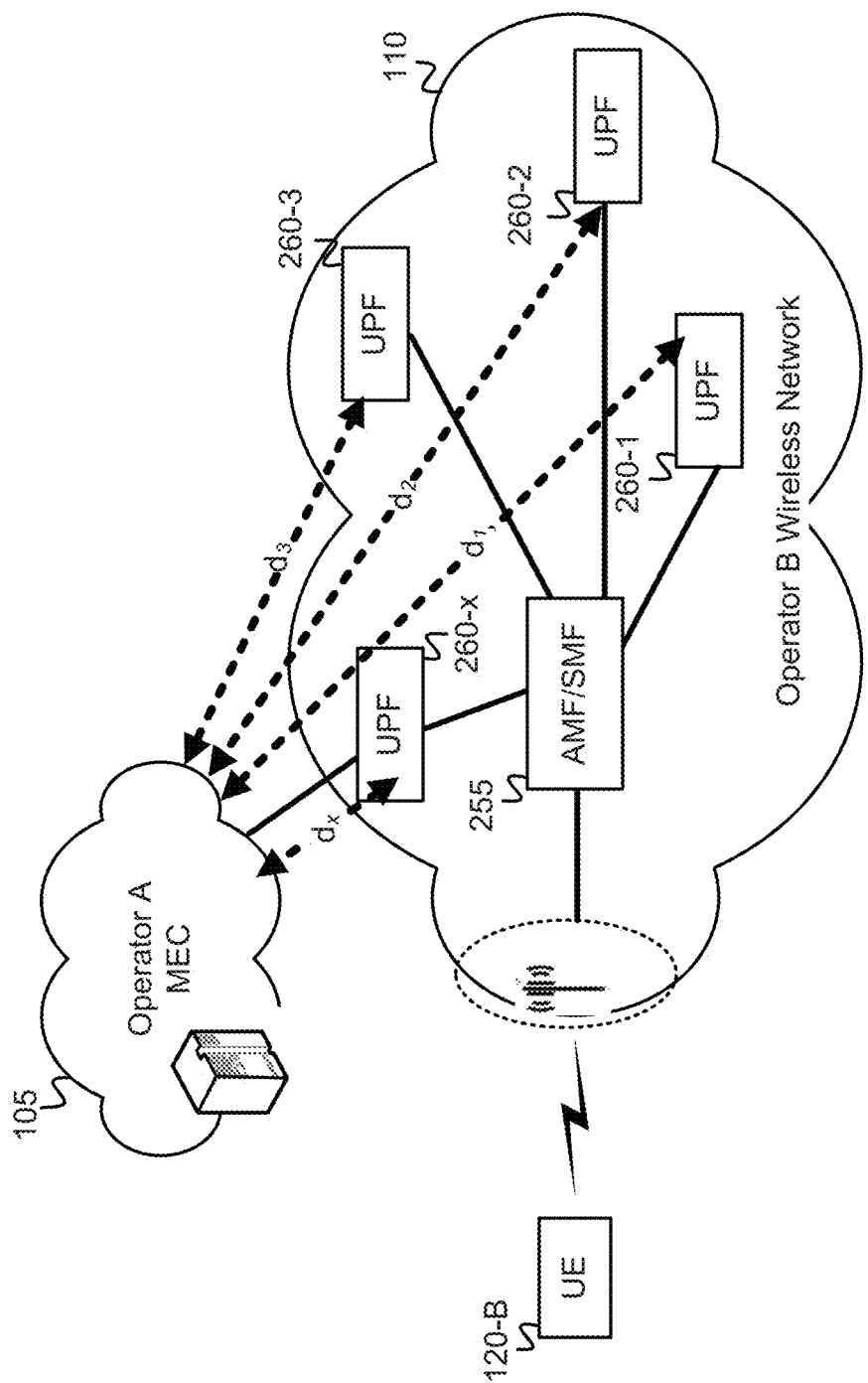
FIG. 6 illustrates an example of the determination of a closest gateway or User Plane Function to a MEC for enabling UE low latency access to MEC services.

FIG. 6 shows an example in which AMF/SMF 255 in network B 110 determines that UPF 260-1 has a distance $d_1$ to MEC A 105, UPF 260-2 has a distance $d_2$ to MEC A 105, UPF 260-3 has a distance $d_3$ to MEC A 105, and UPF 260-$x$ has a distance $d_x$ to MEC A 105, where $d_2 > d_1 > d_3 > d_x$. Thus, in this example, AMF/SMF 255 selects UPF 260-$x$, with distance $d_x$ from MEC A 105, as the closest UPF to provide low latency access between network B 110 and MEC A 105. In some implementations, the connection between the selected MEC and the closest SGW/PGW or UPF may include an indirect connection via PDN 205. In other implementations, the connection between the selected MEC and the closest SGW/PGW or UPF may include a direct connection between network B 110 and MEC A 105. FIG. 5 shows network B 110 setting up 540 a UPF/PGW close to MEC A 105 and connecting the UPF/PGW to MEC A 105.

Figure 7:
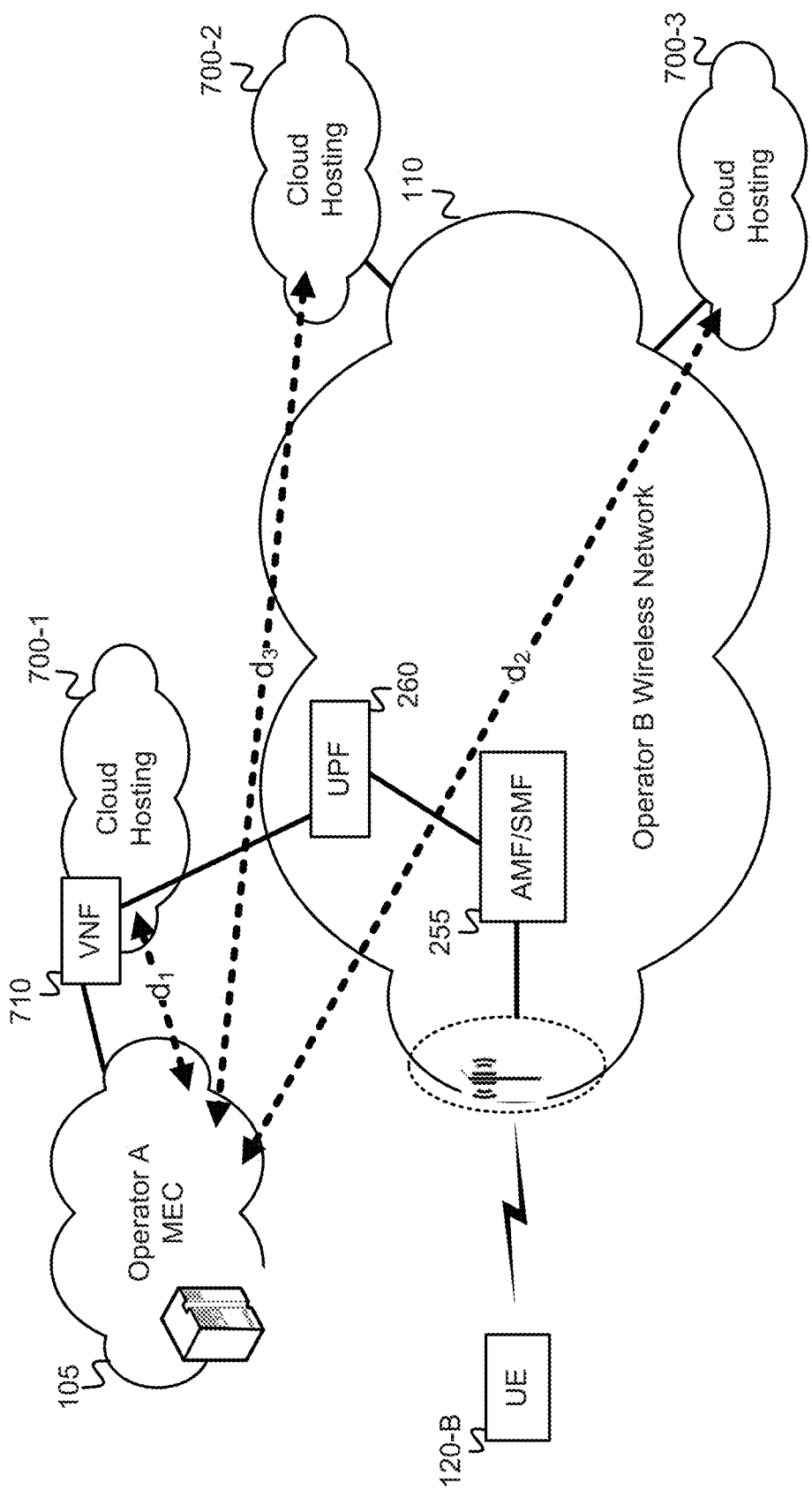
FIG. 7 illustrates an example of the deployment of a Virtual Network Function in a nearby hosting center to enable UE low latency access to MEC services.

In a second, alternative embodiment, wireless network B 110 deploys a Virtual Network Function (VNF) in a nearby hosting center to provide low latency for UE B 120-B's access to MEC A 105 (block 450), and sets up the deployed VNF to connect to MEC A 105 (block 455). FIG. 7 depicts an example VNF deployment in which a node in network 110 selects from cloud hosting centers 700-1, 700-2, and 700-3 for deploying a VNF that will have a closest distance d to MEC A 105 to ensure low latency access. In the example shown, a VNF deployed at cloud hosting center 700-1 will have a distance $d_1$ to MEC A 105, a VNF deployed at cloud hosting center 700-2 will have a distance $d_2$ to MEC A 105, and a VNF deployed at cloud hosting center 700-3 will have a distance $d_3$ to MEC A 105, where $d_2 > d_3 > d_1$. The node in network 110, therefore, selects cloud hosting center 700-1 and deploys VNF 710 to cloud hosting center 700-1. VNF 710 subsequently provides low latency access between network B 110 and MEC A 105. Selection of a "closest" or "close" hosting center for deploying the VNF may include identifying a hosting center 700 that is geographically closest to MEC A 105, or selecting a hosting center 700 that has a lowest latency to and/or from MEC A 105. Further, in some implementations, the first embodiment of blocks 440 and 445, and the second embodiment of blocks 450 and 455, may be performed, and in conjunction with one another (e.g., sequentially, or in parallel, to one another), to reduce latency for UE B 120-B's access to MEC A 105.

Wireless network B 110 sets up a network slice and/or Access Point Name (APN) between UE B 120-B and the target MEC A 105 (block 460). Network B 110 may use existing processes to setup a network slice and/or APN for UE B 120-B to access MEC A 105 via network B 110. The APN may correspond to a name of a gateway (e.g., PGW 285) used to connect to MEC A 105. FIG. 5 depicts network B 110 setting up 545 a network slice and/or APN for UE B 120-B.

UE B 120-B accesses MEC A 105, or downloads/uploads data from/to MEC A 105, via wireless network B 110 and the network slice/APN (block 465). Using the network slice and/or APN, UE B 120-B may access, download data from, or upload data to, MEC A 105 via the closest UPF or SGW/PGW determined in block 440, or the VNF deployed to a cloud hosting center in block 450. FIG. 5 shows UE B 120-B accessing, downloading, or uploading data 550 from/to MEC A 105.

Figure 8A:
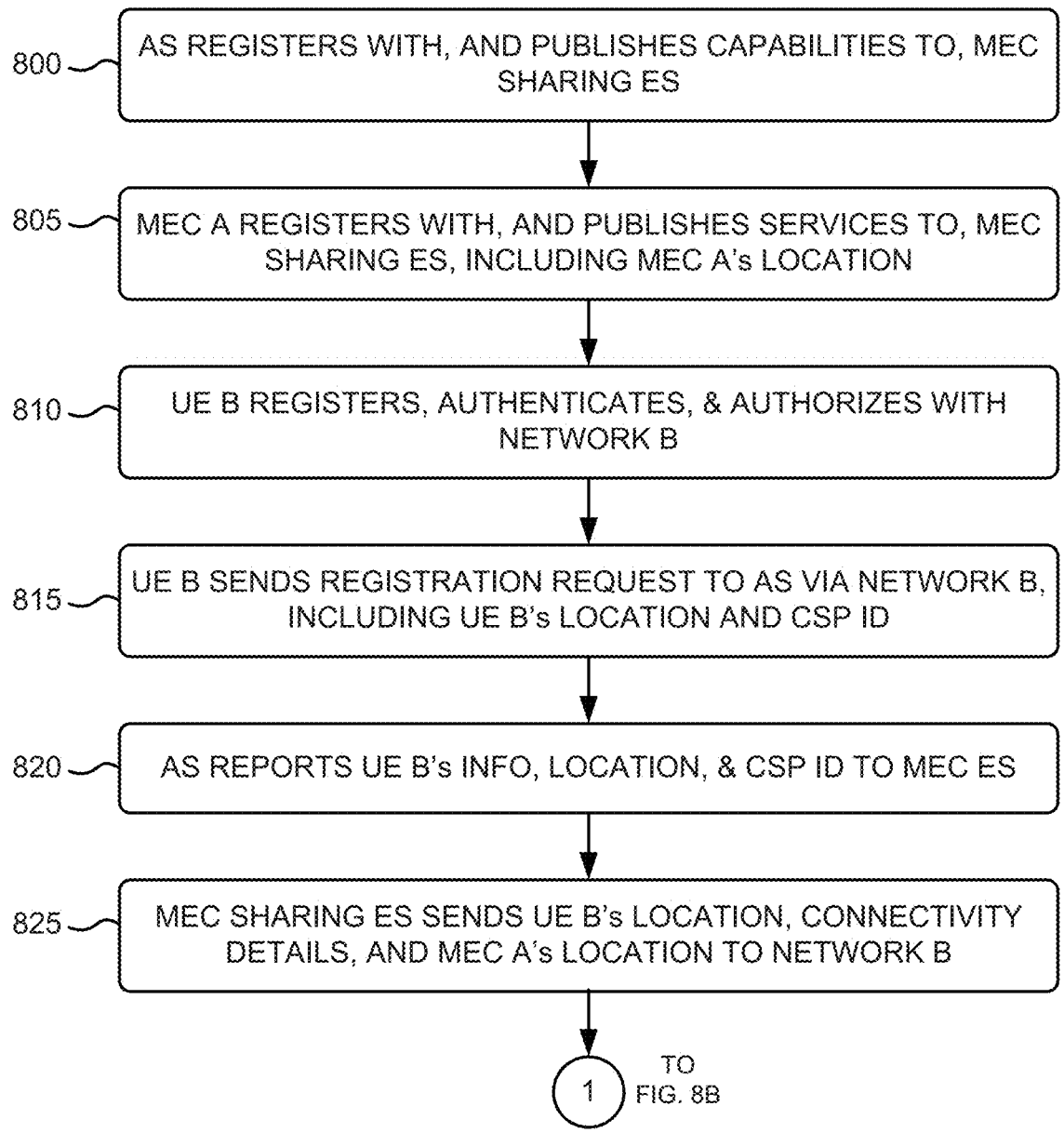
FIGS. 8A and 8B are flow diagrams that illustrate a second implementation of an exemplary process for sharing a MEC data center, operated by a first network operator, for access and use by UEs connected to a wireless network operated by a second network operator.
Figure 8B:
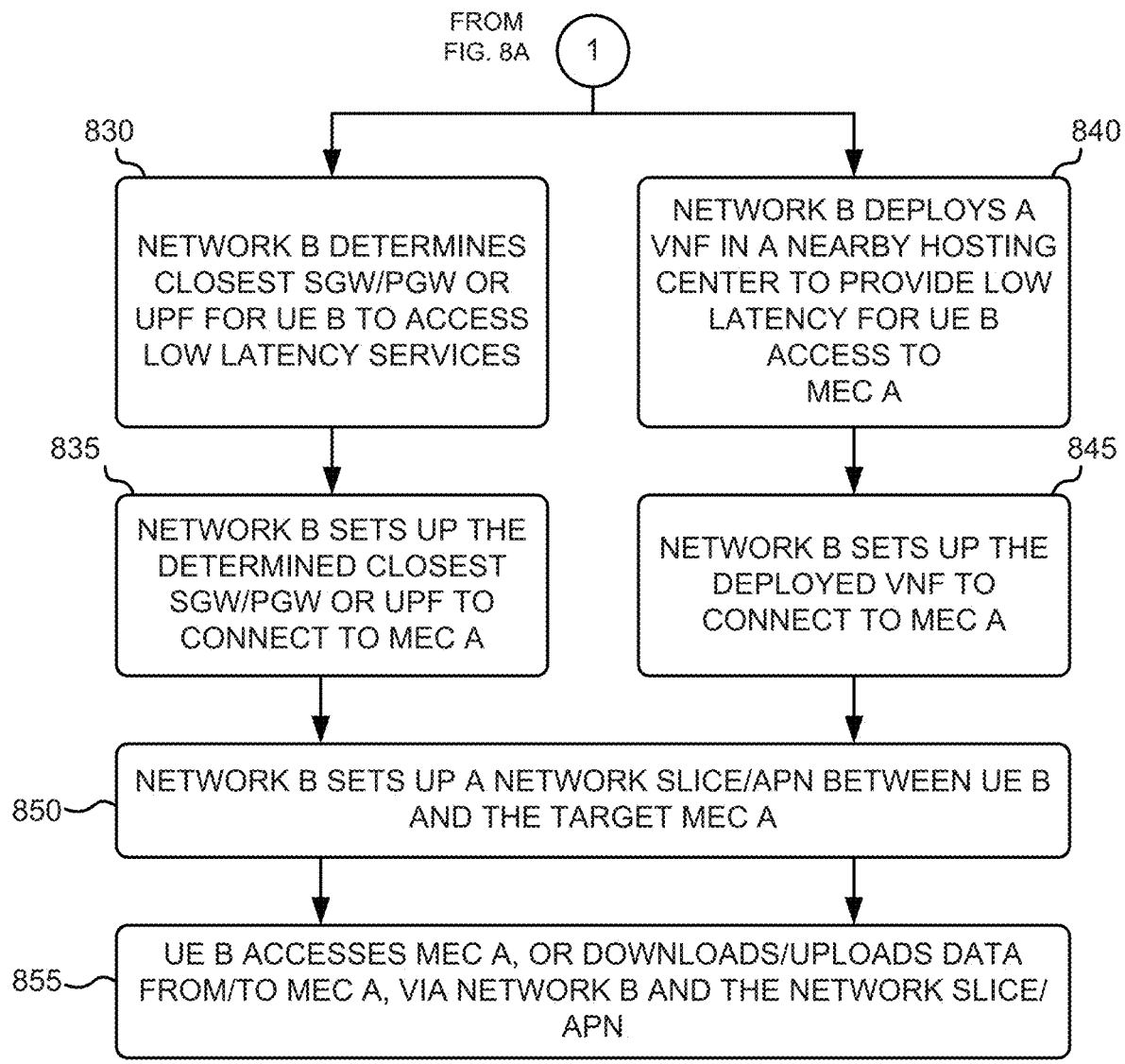

FIGS. 8A and 8B are flow diagrams that illustrate a second implementation of an exemplary process for sharing a MEC data center, operated by a first network operator that operates a first wireless network, for access and use by UEs connected to a wireless network operated by a second network operator. The exemplary process of FIGS. 8A and 8B may be implemented by various components of network environment 200. The exemplary process of FIGS. 8A and 8B is described below with reference to the signal flow diagram of FIG. 9 and the examples of FIGS. 6 and 7.

Figure 9:
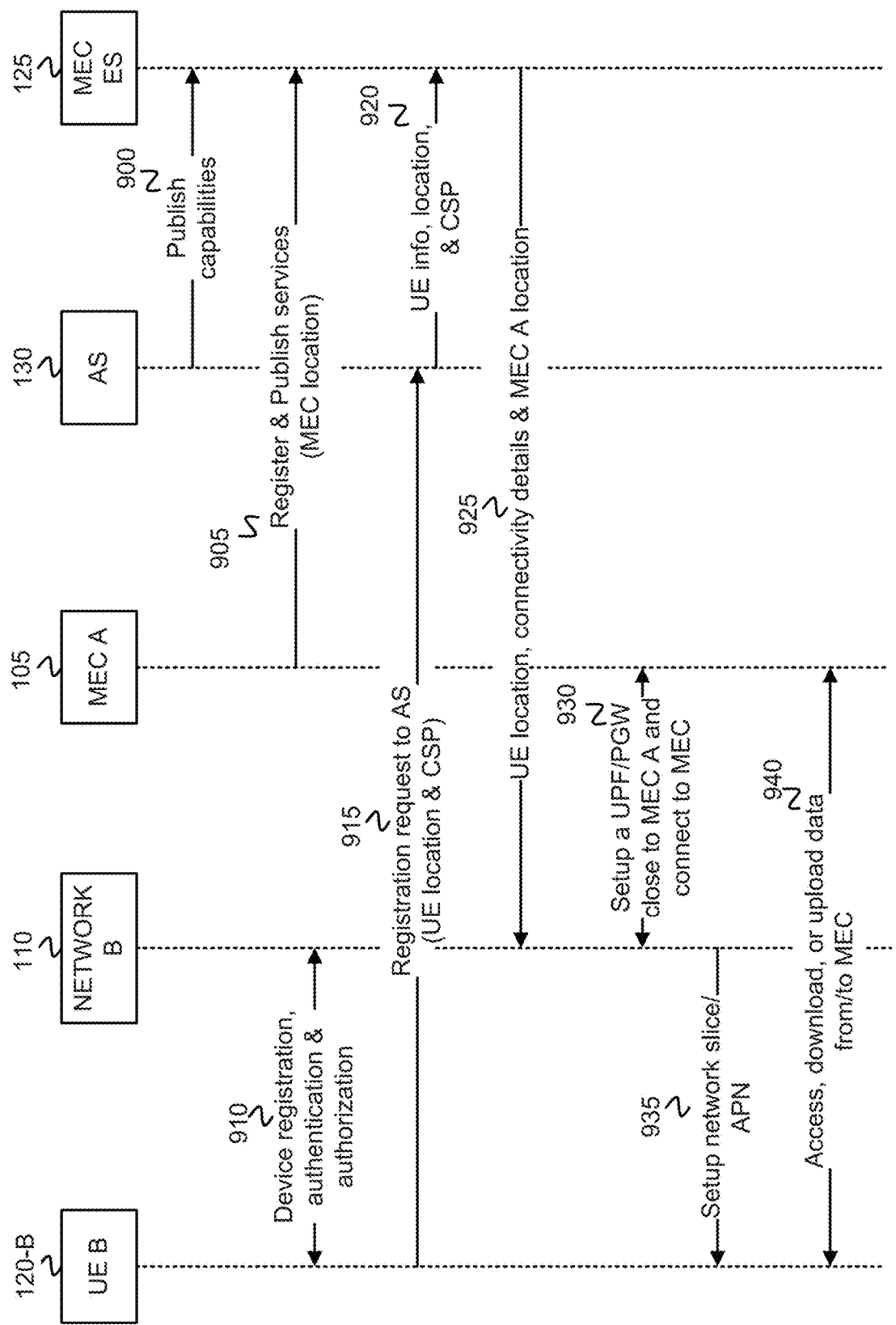
FIG. 9 illustrates an exemplary signal flow diagram associated with the process of FIGS. 8A and 8B.

Prior to execution of the process of FIGS. 8A and 8B, network operator A installs MEC 105 at a particular geographic location and hosts various applications and/or network services at the MEC A 105. Installation of MEC A 105 and hosting of the applications and/or network services by the network operator A may be in accordance with a contract that network operator A has with a government entity or venue (e.g., city, stadium, etc.). In FIG. 9, a UE 120 that subscribes to network service from, and connects to, Operator B wireless network 110 is labeled as "UE B 120-B", and Operator B wireless network 110 is labeled as "network B 110."

The exemplary process includes AS 130 registering with, and publishing its capabilities to, MEC sharing ES 125 (block 800). AS 130 may send a registration request to MEC sharing ES 125 that includes, for example, a network address of AS 130, and data defining AS 130's capabilities. MEC A 105 registers with, and publishes services to, MEC sharing ES 125, including MEC A 105's location (block 805). MEC A 105 may send relevant application, service, and/or network information to MEC sharing ES 125 to enable MEC sharing ES 125 to provide at least a portion of that information to network B 110 such that network B 110 can establish connections with MEC A 105. MEC A 105 may, for example, periodically report its current capabilities and network services to MEC sharing ES 125. MEC sharing ES 125 stores the MEC information in memory for subsequent retrieval. FIG. 9 depicts AS 130 sending a message 900 to publish its capabilities to MEC sharing ES 125, and MEC A 105 sending a message 905 to register and publish its services, including MEC A 105's location, to MEC sharing ES 125.

UE B 120-B registers, authenticates, and authorizes with wireless network B 110 (block 810). UE B 120-B engages in existing processes of registration, authentication, and network authorization to attach to network B 110 and establish a connection with network B 110. UE B 120-B then sends a registration request to AS 130 via wireless network B 110, including UE B 120-B's location and CSP identifier (ID) (block 815). An application at UE B 120 may be pre-loaded with a network address of AS 130 to enable UE B 120-B to register with AS 130 for initiating a process of obtaining access to a local MEC (e.g., MEC A 105). The registration request sent by UE B 120-B may include, among other data, a current location of UE B 120 and a CSP ID associated with the wireless network currently serving UE B 120-B (e.g., network B 110 in this example). UE B 120-B may, for example, obtain its location from Global Positioning System (GPS) system data available at UE B 120-B. Other types of geolocation techniques (e.g., triangulation) may, however, be used to determine a current location of UE B 120-B. FIG. 9 shows UE B 120-B registering, authenticating and authorizing 910 with network B 110, and UE B 120-B sending a registration request 915 to AS 130 that includes UE B 120-B's current location and a CSP ID of the wireless network (e.g., network B 110) currently serving UE B 120-B.

AS 130 reports UE B 120's information, location, and CSP ID to MEC sharing ES 125 (block 820). AS 130, subsequent to receiving the registration request from UE B 120-B, sends a message to MEC sharing ES 125 that includes the UE B 120's current location, the CSP ID of the wireless network currently serving UE B 120-B, and other UE information (e.g., connectivity details, etc.). MEC sharing ES 125 stores the UE information in memory for subsequent retrieval. MEC sharing ES 125, in turn, sends UE B 120-B's location and connectivity details, and MEC A 105's location to network B 110 (block 825). MEC sharing ES 125 retrieves the UE B 120-B's most recent reported location and connectivity information, and MEC A 105's location, from local memory, and inserts the information into a message for sending to network B 110. FIG. 9 depicts AS 130 sending a message 920 that includes UE B 120-B's information, location, and a CSP ID associated with network B 110. FIG. 9 further shows MEC sharing ES 125 sending a message 925 to network B 110 that includes UE B 120-B's location and connectivity details, and the location of MEC A 105.

In a first embodiment, wireless network B 110 determines a closest SGW/PGW or UPF for UE B 120-B to access low latency services (block 830) and sets up the determined closest SGW/PGW or UPF to connect to MEC A 105 (block 835). If there are multiple registered MEC's in proximity to UE B 120-B, a node in network B 110 (e.g., an MME or AMF/SMF) compares UE B 120-B's location (obtained in block 435) with MEC locations (obtained in block 435) to identify and select a closest MEC of multiple MECs to UE B 120-B that hosts a particular application or service. The node in network B 110 then identifies a SGW/PGW or UPF that is closest to the selected MEC (e.g., MEC A 105) to enable UE B 120-B to access the MEC with the lowest latency. The node in network B 110 (or another node in cooperation with the first node) sets up a connection between the selected MEC and the identified closest SGW/PGW or UPF within network B 110.

Returning to the example of FIG. 6, AMF/SMF 255 in network 110 determines that UPF 260-1 has a distance $d_1$ to MEC A 105, UPF 260-2 has a distance $d_2$ to MEC A 105, UPF 260-3 has a distance $d_3$ to MEC A 105, and UPF 260-$x$ has a distance $d_x$ to MEC A 105, where $d_2 > d_1 > d_3 > d_x$. Thus, in this example, AMF/SMF 255 selects UPF 260-$x$, with distance $d_x$ from MEC A 105, as the closest UPF to provide low latency access between network B 110 and MEC A 105. In some implementations, the connection between the selected MEC and the closest SGW/PGW or UPF may include an indirect connection via PDN 205. In other implementations, the connection between the selected MEC and the closest SGW/PGW or UPF may include a direct connection between network B 110 and MEC A 105. FIG. 9 shows network B 110 setting up 930 a UPF/PGW close to MEC A 105 and connecting the UPF/PGW to MEC A 105.

In a second, alternative embodiment, wireless network B 110 deploys a Virtual Network Function (VNF) in a nearby hosting center to provide low latency for UE B 120-B's access to MEC A 105 (block 845), and sets up the deployed VNF to connect to MEC A 105 (block 845). Returning to the example VNF deployment of FIG. 7, a node in network 110 selects from cloud hosting centers 700-1, 700-2, and 700-3 for deploying a VNF that will have a closest distance d to MEC A 105 to ensure low latency access. In the example shown, a VNF deployed at cloud hosting center 700-1 will have a distance $d_1$ to MEC A 105, a VNF deployed at cloud hosting center 700-2 will have a distance $d_2$ to MEC A 105, and a VNF deployed at cloud hosting center 700-3 will have a distance $d_3$ to MEC A 105, where $d_2 > d_3 > d_1$. The node in network 110, therefore, selects cloud hosting center 700-1 and deploys VNF 710 to cloud hosting center 700-1. VNF 710 subsequently provides low latency access between network B 110 and MEC A 105.

Network B 100 sets up a network slice/APN between UE B 120-B and the target MEC (e.g., MEC A 1050 (block 850). Network B 110 may use existing processes to setup a network slice and/or APN for UE B 120-B to access MEC A 105 via network B 110. The APN may correspond to a name of a gateway (e.g., PGW 285) used to connect to MEC A 105. FIG. 9 depicts network B 110 setting up 935 a network slice and/or APN for UE B 120-B. UE B 120-B accesses MEC A 105, or downloads/uploads data from/to MEC A 105, via network B and the network slice/APN (block 855). Using the network slice and/or APN, UE B 120-B may access, download data from, or upload data to, MEC A 105 via the closest UPF or SGW/PGW determined in block 830, or the VNF deployed to a cloud hosting center in block 840. FIG. 9 shows UE B 120-B accessing, downloading, or uploading data 940 from/to MEC A 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4A, 4B, 8A, and 8B and sequences of operations, messages/signals, and data flows with respect to FIGS. 5 and 9, the order of the blocks, the operations, messages/signals, and/or data flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method, comprising:
receiving, at a network device in a first wireless network operated by a first network operator, a first location of a user equipment device (UE) connected to a first radio access network (RAN) of the first network operator, and a second location of a first Multi-Access Edge Computing (MEC) data center operated by a second network operator of a second wireless network served by a second RAN, wherein the first location and the second location are obtained from information received via a shared RAN, with which the UE and the first MEC data center have previously registered;
performing at least one of:
  determining, by the network device, a closest gateway or user plane function (UPF) to the first MEC data center within the first wireless network; or
  deploying a Virtual Network Function (VNF) in a hosting center that is close to the first MEC data center; and
setting up, by the network device in the first wireless network, a connection between at least one of:
  the determined closest gateway or UPF and the first MEC data center, or
  the deployed VNF and the first MEC data center, to enable the UE to access an application service hosted by the first MEC data center via a network session with the first wireless network using the connection to the first RAN.

2. The method of claim 1, wherein deploying the VNF in the hosting center comprises:
identifying a hosting center that is close to the first location or the second location; and
deploying the VNF at the identified hosting center.

3. The method of claim 1, wherein determining the closest gateway or UPF to the first MEC data center comprises:
comparing locations of multiple gateways or UPFs within the first wireless network to at least one of the first location or the second location; and
selecting one of the multiple gateways or UPFs as the closest gateway or UPF based on the comparison.

4. The method of claim 1, further comprising:
setting up at least one of a network slice or an Access Point Name (APN) between the first wireless network and the first MEC data center.

5. The method of claim 4, wherein the UE accesses the first MEC data center via the first wireless network and the network slice or APN.

6. The method of claim 1, wherein no MEC data center associated with the first network operator is located in proximity to the first location of the UE, and
wherein determining the closest gateway or UPF to the first MEC data center comprises:
  determining, based on the first location and the second location, a gateway or UPF that is geographically closest to the first MEC data center, or that has a lowest latency to the first MEC data center, and
wherein deploying the VNF in a hosting center comprises:
  deploying the VNF in a hosting center that, based on the first location and the second location, is geographically closest to the first MEC data center, or that has a lowest latency to the first MEC data center.

7. The method of claim 1, wherein the network device receives the first location of the UE and the second location of the first MEC data center from a second network device of the shared RAN, and
wherein the second network device includes a roadside unit communicably coupled to a vehicle associated with the UE.

8. A network device, comprising:
at least one communication interface configured to receive, via a first wireless network operated by a first network operator, a first location of a user equipment device (UE) connected to a first radio access network (RAN) of the first network operator, and a second location of a first Multi-Access Edge Computing (MEC) data center operated by a second network operator of a second wireless network served by a second RAN, wherein the first location and the second location are obtained from information received via a shared RAN, with which the UE and the first MEC data center have previously registered;
a processor or logic configured to:
  perform at least one of:
    determine a closest gateway or user plane function (UPF) to the first MEC data center within the first wireless network; or
    deploy a Virtual Network Function (VNF) in a hosting center that is close to the first MEC data center; and
  set up, in the first wireless network, a connection between at least one of:
    the determined closest gateway or UPF and the first MEC data center, or
    the deployed VNF and the first MEC data center, to enable the UE to access an application service hosted by the first MEC data center via a network session with the first wireless network using the connection to the first RAN.

9. The network device of claim 8, wherein, when deploying the VNF in the hosting center, the processor or logic is further configured to:
identify a hosting center that is close to the first location or the second location; and
deploy the VNF at the identified hosting center.

10. The network device of claim 8, wherein, when determining the closest gateway or UPF to the first MEC data center, the processor or logic is further configured to:
compare locations of multiple gateways or UPFs within the first wireless network to at least one of the first location or the second location; and
select one of the multiple gateways or UPFs as the closest gateway or UPF based on the comparison.

11. The network device of claim 8, wherein the processor or logic is further configured to:
set up at least one of a network slice or an Access Point Name (APN) between the first wireless network and the first MEC data center.

12. The network device of claim 11, wherein the UE accesses the first MEC data center via the first wireless network and the network slice or APN.

13. The network device of claim 8, wherein no MEC data associated with the first network operator is located in proximity to the first location of the UE, and
wherein, when determining the closest gateway or UPF to the first MEC data center, the processor or logic is configured to:
  determine, based on the first location and the second location, a gateway or UPF that is geographically closest to the first MEC data center, or that has a lowest latency to the first MEC data center, and
wherein, when deploying the VNF in a hosting center, the processor or logic is configured to:

deploy the VNF in a hosting center that, based on the first location and the second location, is geographically closest to the first MEC data center, or that has a lowest latency to the first MEC data center.

14. The network device of claim 8, wherein the network device receives the first location of the UE and the second location of the first MEC data center from a second network device of the shared RAN, and wherein the second network device includes a roadside unit communicably coupled to a vehicle associated with the UE.

15. A non-transitory storage medium storing instructions executable by a network device with one or more processors, wherein execution of the instructions cause the network device to:

receive, at the network device in a first wireless network operated by a first network operator, a first location of a user equipment device (UE) connected to a first radio access network (RAN) of the first network operator, and a second location of a first Multi-Access Edge Computing (MEC) data center operated by a second network operator of a second wireless network served by a second RAN, wherein the first location and the second location are obtained from information received via a shared RAN, with which the UE and the first MEC data center have previously registered;

perform at least one of:
  determining, by the network device, a closest gateway or user plane function (UPF) to the first MEC data center within the first wireless network; or
  deploying a Virtual Network Function (VNF) in a hosting center that is close to the first MEC data center; and set up, by the network device in the first wireless network, a connection between at least one of:
  the determined closest gateway or UPF and the first MEC data center, or
  the deployed VNF and the first MEC data center, to enable the UE to access an application service hosted by the first MEC data center via a network session with the first wireless network using the connection to the first RAN.

16. The non-transitory storage medium of claim 15, wherein execution of the instructions cause the network device to deploy the VNF in the hosting center further causes the network device to:

identify a hosting center that is close to the first location or the second location; and deploy the VNF at the identified hosting center.

17. The non-transitory storage medium of claim 15, wherein execution of the instructions to cause the network device to determine the closest gateway or UPF to the first MEC data center further causes the device to:

compare locations of multiple gateways or UPFs within the first wireless network to at least one of the first location or the second location; and select one of the multiple gateways or UPFs as the closest gateway or UPF based on the comparison.

18. The non-transitory storage medium of claim 15, wherein execution of the instructions further cause the network device to:

set up at least one of a network slice or an Access Point Name (APN) between the first wireless network and the first MEC data center, wherein the UE accesses the first MEC data center via the first wireless network and the network slice or APN.

19. The non-transitory storage medium of claim 15, wherein no MEC data associated with the first network operator is located in proximity to the first location of the UE, and wherein execution of the instructions to cause the network device to determine the closest gateway or UPF to the first MEC data center further causes the network device to:

determine, based on the first location and the second location, a gateway or UPF that is geographically closest to the first MEC data center, or that has a lowest latency to the first MEC data center, and wherein execution of the instructions to cause the network device to deploy the VNF in a hosting center further causes the network device to:

deploy the VNF in a hosting center that, based on the first location and the second location, is geographically closest to the first MEC data center, or that has a lowest latency to the first MEC data center.

20. The non-transitory storage medium of claim 15, wherein the network device receives the first location of the UE and the second location of the first MEC data center from a second network device of the shared RAN, and wherein the second network device includes a roadside unit communicably coupled to a vehicle associated with the UE.

* * * * *